Oct. 18, 1927.

S. A. WILDE 1,645,843

GAS RANGE

Filed May 19, 1926

INVENTOR:
Samuel A. Wilde
BY Craig Hayes
ATTORNEYS:

Oct. 18, 1927.

S. A. WILDE 1,645,843

GAS RANGE

Filed May 19, 1926

INVENTOR:
Samuel A. Wilde
By
ATTORNEYS.

Patented Oct. 18, 1927.

1,645,843

UNITED STATES PATENT OFFICE.

SAMUEL A. WILDE, OF TAUNTON, MASSACHUSETTS, ASSIGNOR TO GLENWOOD RANGE COMPANY, OF TAUNTON, MASSACHUSETTS, A CORPORATION OF MASSACHUSETTS.

GAS RANGE.

Application filed May 19, 1926. Serial No. 110,269.

The invention relates to an improvement in gas ranges especially those of a type having an insulated bake oven and warming chamber located above the oven.

Heretofore when the bake oven was uninsulated heat radiating from the top of the bake oven was sufficient to adequately heat the warming oven located above it. With the top wall of the bake oven insulated there is so little heat radiation that not only is the warming chamber inadequately heated, but a serious question has arisen as to how it might be heated without material change in the general structure of the range.

The object of the invention is accordingly to provide an arrangement by which the warming chamber may be heated when the bake oven is insulated, and without material change in the general structure of the range.

As will later be seen the object is accomplished by an arrangement for taking advantage of or utilizing hot gases which heretofore have been allowed to escape and have gone to waste.

The invention can best be seen and understood by reference to the drawings in which it is shown applied to a common type of gas range, such portion only being shown as is necessary to a proper understanding of the invention, and in which—

Referring to the drawings:—

Figure 1:
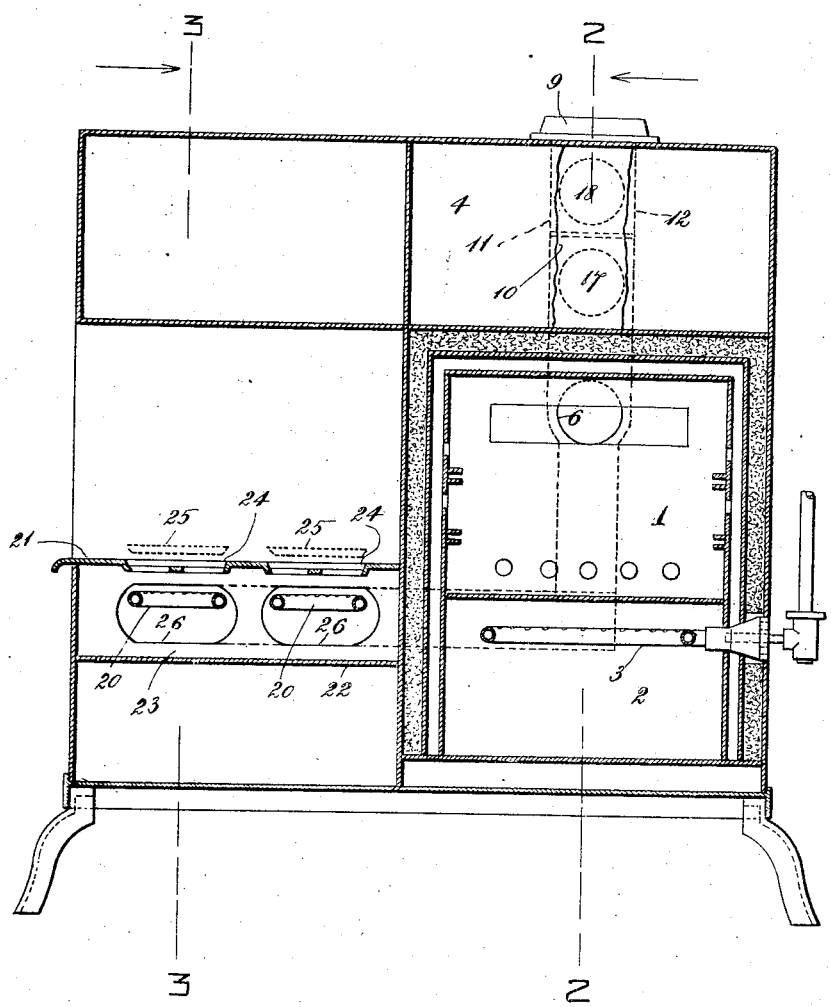
Figure 1 is a section of the range taken on the line 1—1 of Fig. 2.
Figure 3:
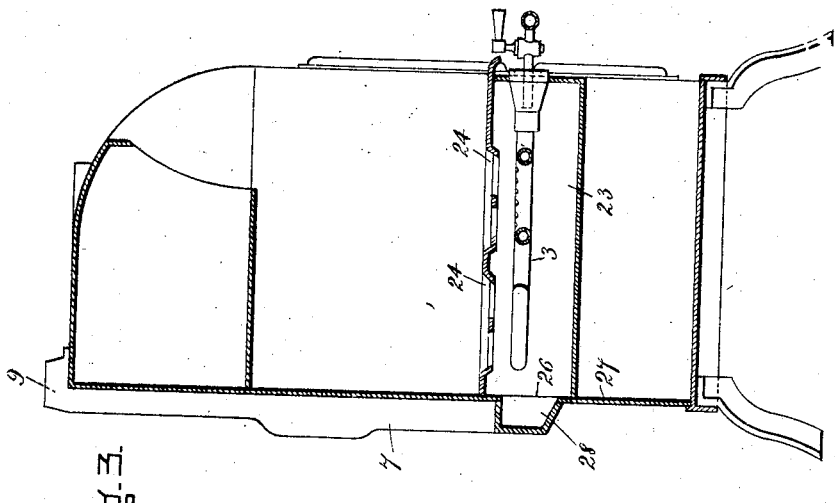
Fig. 3 is a section on the line 3—3 of Fig. 1.
Figure 2:
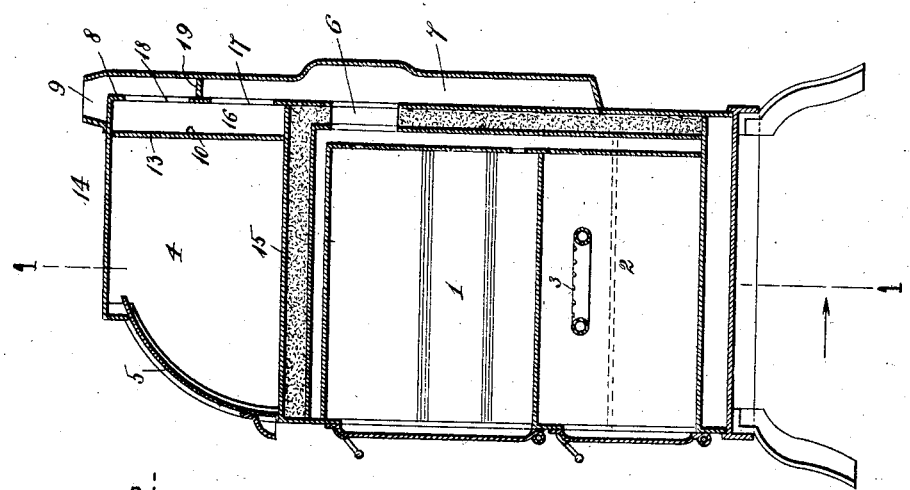
Fig. 2 is a section on the line 2—2 of Fig. 1.

1 represents the insulated bake oven. 2 is a burner chamber located beneath the bake oven having in it a burner 3 by which the bake oven is heated. 4 is a warming chamber located above the bake oven and which is closed by a sliding door 5. It is to this chamber the purpose of the invention is to supply heat.

In the usual manner of heating the bake oven, air heated by the burner 3 will pass from the burner chamber 2 through the bake oven 1 and thence will escape through an outlet 6 in the insulated back wall of the oven into a flue 7 connecting with the chimney.

According to the present arrangement heat (meaning heated air or gases) escaping from the bake oven and directed into the flue 7, is used for heating the warming chamber. For this purpose the flue 7 is extended upwardly by the back wall 8 of the warming chamber with an outlet 9 above this chamber at the top of the range.

A radiator 10 is located at the back of the warming chamber with inside projection forward from the rear wall of this chamber and lying adjacent the flue 7 extending along the back outside the chamber. The radiator 10 is of boxlike character built of metal plates from which heat from the heated air or gases introduced to pass through the radiator may readily radiate.

It consists of two spaced side plates 11 and 12, respectively, connected at the front by a plate 13. All these radiator plates make closed connection with the top and bottom walls 14 and 15, respectively, of the warming chamber, while the spaced side plates 11 and 12 make closed connection with the back wall 8 of the warming chamber, thereby leaving inside the radiator a hot air chamber 16 through which heated air or gases from the flue 7 are directed to pass.

Heated air or gases are directed to pass into and out of the chamber 16 of the radiator from the flue 7 by way of inlet and outlet openings 17 and 18, respectively.

These openings are formed in the rear wall of the warming chamber in that portion thereof around which the radiator is built on the inside and by which the flue 7 is directed to pass on the outside. The inlet opening 17 opens into the bottom of the radiator chamber and the outlet 18 is from the top of this chamber. At a point lying approximately between the two openings the flue 7 is provided with a partition 19 by which hot air or gases within the flue will be directed to pass through the opening 17 into the chamber of the radiator from below the partition and thence will escape from the radiator chamber by way of the outlet 18 back into the flue above the partition, thence passing to the atmosphere or chimney through the flue outlet 9 at the top of the range.

Arrangement is also made for supplying heat to the warming chamber when the bake oven is not in use, but when cooking is being carried on by open burners with which gas ranges of the present type are usually provided.

20, 20 represent such open burners. In order that the heat from these burners may be availed of for heating the warming chamber, a stove top 21 is provided above the burners and a bottom plate 22 below the burners, both stove top and bottom plates cooperating with the surrounding walls of the stove structure to form a burner chamber 23 within which heat or heated air from the burners 20 may be confined and thereby made available for heating the warming chamber. It will be understood that the cooking is carried on from the burners 20, 20 through openings 24 in the stove top which are closed for any burner not in use by a lid 25.

For the purpose of directing heat from the burner chamber 23 to the warming chamber, openings 26 are formed in the rear wall 27 of this chamber. These openings open into a flue 28 which extends laterally by the rear of the range and connects with the flue 7, the heat then rising through this flue to pass through the radiator 10 in the warming chamber the same as before.

It will therefore be seen that when the range is in operation, whatever burners are used, heat will be directed to pass through the radiator in the warming chamber for heating this chamber.

Having thus fully described my invention, I claim and desire to secure by Letters Patent of the United States:—

1. A gas range having a warming chamber, an outlet flue for heated air and gases developed within the range directed to pass by the rear wall of the warming chamber outside said chamber, a radiator at the back of the warming chamber with inside projection forward of its rear wall and closed from the warming chamber but in open communication with said flue, and means whereby the heated air and gases from the range passing through said outlet flue will be directed to pass through said radiator and return to the flue.

2. In a gas range, the combination comprising an oven, a warming chamber located above the oven, means for heating the oven, an outlet flue for heated air and gases from the oven passing from the back of the oven upwardly by the back of the warming chamber outside the rear wall of said chamber, a radiator at the back of the warming chamber with inside projection forward of its rear wall and closed from the warming chamber but in open communication with said flue, and means whereby the heated air and gases from the oven passing through said outlet flue will be directed to pass through the radiator and return to the flue.

3. In a gas range having a top warming chamber, the combination therewith of an outlet flue for spent heated air and gases from the range passing by the rear wall of the warming chamber outside said chamber, a radiator located at the back of the warming chamber with projection forward of its rear wall and comprising a number of plates connected with one another and with the top, bottom and rear walls, respectively, of said chamber whereby the radiator will be closed from said chamber but in open communication with said flue, and means whereby the spent heated air and gases passing through the outlet flue will be directed to pass through the radiator for heating the warming chamber with return to the flue.

4. In a gas range, the combination comprising an insulated oven having an outlet for heated air, means for heating the air in the oven, a stove top arranged alongside the oven having an opening in it with removable lid for closing the opening, walls cooperating with said top to form a burner chamber having an outlet for air heated within the chamber, a burner within the burner chamber arranged below the opening in the stove top, a warming chamber arranged above the oven and insulated from it, a radiator located at the back of the warming chamber with inside projection forward of its rear wall, a flue passage leading by the rear side of the warming chamber adjacent the radiator and connecting with the respective outlets from the oven and burner chamber, and means whereby heated air passing through the flue will be directed to pass through the radiator in the warming chamber for heating it.

SAMUEL A. WILDE.